United States Patent [19]

Kordosky et al.

[11] Patent Number: 5,470,552
[45] Date of Patent: Nov. 28, 1995

[54] NICKEL EXTRACTION PROCESS

[75] Inventors: Gary A. Kordosky; Stephen M. Olafson, both of Tucson, Ariz.

[73] Assignee: Henkel Corporation, Plymouth Meeting, Pa.

[21] Appl. No.: 142,883

[22] Filed: Oct. 25, 1993

Related U.S. Application Data

[63] Continuation of Ser. No. 559,458, Jul. 24, 1990, abandoned, which is a continuation of Ser. No. 206,535, Jun. 14, 1988, abandoned.

[51] Int. Cl.$^6$ .............................. B01D 11/00; C22B 23/00
[52] U.S. Cl. .................................................. 423/139
[58] Field of Search ........................... 423/139, DIG. 14; 75/722; 210/688; 556/32, 37

[56] References Cited

U.S. PATENT DOCUMENTS

| | | | |
|---|---|---|---|
| 3,907,966 | 9/1975 | Skarbo | 423/139 |
| 3,981,968 | 9/1976 | Miller et al. | 423/139 |
| 4,020,106 | 4/1977 | Ackerley et al. | 423/139 |
| 4,065,502 | 12/1977 | MacKay et al. | 260/590 |
| 4,142,952 | 3/1979 | Dalton | 423/139 |
| 4,148,813 | 4/1979 | Rappas et al. | 260/439 |
| 4,148,816 | 4/1979 | Rappas et al. | 260/439 |
| 4,152,396 | 5/1979 | MacKay et al. | 423/139 |
| 4,157,012 | 6/1979 | DuBell | 60/39.56 G |
| 4,231,888 | 11/1980 | Dalton | 252/182 |
| 4,507,268 | 3/1985 | Kordosky et al. | 423/24 |
| 5,174,812 | 12/1992 | Price et al. | 423/139 |

FOREIGN PATENT DOCUMENTS

| | | | |
|---|---|---|---|
| 1411545 | 10/1975 | United Kingdom | 423/139 |
| 8809389 | 12/1988 | WIPO | 423/139 |

OTHER PUBLICATIONS

Lo, T. C., et al., Handbook of Solvent Extraction, May, 1984, pp. 634, 653–655.
The S.E.C. Nickel Process, Eliasen et al., pp. 82–86, no month, 1973.
New Recovery Process in Yield Both Electrolytic Nickel & Copper, no date.
The Operation of a Nickel Solvent Extraction and Electrowinning Circuit, R. D. Eliasen, pp. 1–7, no date.
Shell Metal Extractant 529—A New Selective Extractant for Copper & Nickel, Van der Zeeuw, pp. 1039–1055, no date.
The Effect of Alkyl Phenols on the Copper Transfer Properties of the Extractant Acorga P–1, Dalton, pp. 40–48, no date.
The Use of pH Control in Solvent Extraction Circuits, Kordosky et al., pp. 6–11, no date.
Modified Aldoxime Reagents for the Solvent Extraction of Copper, R. F. Dalton et al., pp. 107–116, no date.

*Primary Examiner*—Steven Bos
*Attorney, Agent, or Firm*—Ernest G. Szoke; Wayne C. Jaeschke; Patrick J. Span

[57] ABSTRACT

The recovery of nickel from aqueous ammoniacal solutions containing nickel values by extraction of the nickel values therefrom with an organic solution containing an oxime extractant and an equilibrium modifier followed by stripping of the nickel values from the organic solution by a concentrated aqueous ammoniacal solution from which the nickel can then be recovered. The use of the equilibrium modifier and the concentrated ammonia stripping solution provides advantages in that (1) there is an increase in the nickel transfer of the reagent, (2) the strip solution can be built to a higher nickel concentration giving a lower volume nickel containing solution for further processing and (3) a lesser number of stripping stages are required.

10 Claims, 1 Drawing Sheet

NICKEL EXTRACTION PROCESS

This application is a continuation of application Ser. No. 07/559,458 filed on Jul. 24, 1990, now abandoned which was a continuation of application Ser. No. 07/206,535 filed on Jun. 14, 1988, now abandoned.

BACKGROUND OF THE INVENTION

1. Field of the Invention

This invention relates to the recovery of nickel from aqueous commercial solutions containing nickel values by extraction of the nickel value therefrom with an organic solution containing an oxime extractant and an equilibrium modifier followed by stripping of the nickel values from the organic solution by a concentrated aqueous ammoniacal solution from which the nickels can then be recovered. The use of the equilibrium modifier and the concentrated ammonia stripping solution provides advantages in that (1) there is an increase in the nickel transfer of the reagent, (2) the strip solution can be built to a higher nickel concentration giving a lower volume nickel containing solution for further processing and (3) a lesser number of stripping stages are required.

2. Statement of Related Art

U.S. Pat. Nos. 4,065,502 and 4,157,012 describe a group of β-diketones which are useful for recovering nickel or copper values from aqueous ammoniacal leach solutions, U.S. Pat. No. 4,152,396 describes the recovery of nickel or cobalt using fluorinated β-diketones from acidic aqueous solution.

U.S. Pat. Nos. 4,148,813 and 4,148,816 describe the solvent extraction of cobalt and nickel employing mercaptide extractants. A description of a commercial operation recovering nickel values can be found in the The S.E.C. Nickel Process, Hydrometallurgy, CIM Bulletin, February 1974, pp. 82–86. Reference is made to LIX® 64N, a benzophenone oxime extractant reagent. Reference to this process is also found in a reprint from the Engineering and Mining Journal, 1972, entitled "New Recovery Process Can Yield Both Electrolytic Nickel and Copper". The flow sheet shown therein is also found in a paper presented in a Symposium on Solvent Ion Exchange, American Institute of Chemical Engineers, Arizona Section, Tuscon, 1973, by R. D. Eliassen, Manager, Chemical Division of S.E.C. Corporation, entitled "The Operation of a Nickel Solvent Extraction and Electrowinning Circuit", pp. 1–7.

The use of an acetophenone oxime extractant in the recovery of copper and nickel from ammoniacal solution is described in International Symposium on Copper Extraction and Refining, Feb. 22–26, 1976, Las Vegas, Nev., Volume II, Extractive Metallurgy of Copper, Hydrometallurgy and Electrowinning, Chapter 54, pp. 1039–1055, entitled "Shell Metal Extractant 529—A New Selective Extractant for Copper and Nickel", by A. J. Van der Zeeuw.

Copper and nickel extraction in ammonia systems are also described in "The Use of pH Control In Solvent Extraction Circuits", at pp. 6–9 and FIGS. 9–12, of a paper distributed by Henkel Corporation, which paper was presented at the AIME Annual Meeting, New Orleans, La., Feb. 19–23, 1979.

The use of alkylphenols in combination with oxime extractants is described in CIM Special Volume 21, ISEC, 1977, pp. 40–48, in an article "The Effect of Alkyl Phenols on the Copper Transfer Properties of the Extractant Acorga P-1" by R. F. Dalton. U.S. Pat. No. 4,336,231 which is a continuation of U.S. Pat. No. 4,231,888, a division of U.S. Pat. No. 4,142,952, and which describes copper extraction with either salicylaldoximes or benzophenone oxime and alkyl phenols. Nickel is found in a general list of metals.

The use of equilibrium modifiers in the extraction of copper is also discussed in "Modified Aldoxime Reagents for the Solvent Extraction of Copper" by R. F. Dalton and G. W. Seward, pp. 107–116, in Reagents in the Minerals Industry, Edited by M. J. Jones and R. Oblett, Institute of Mining and Metallurgy, September 1984.

U.S. Pat. No. 4,507,268 describes equilibrium modifiers such as tridecanol, nonylphenol and tributyl phosphate employed with various hydroxyaryl ketoximes and hydroxyaryl aldoximes.

BRIEF SUMMARY

Figure 1:
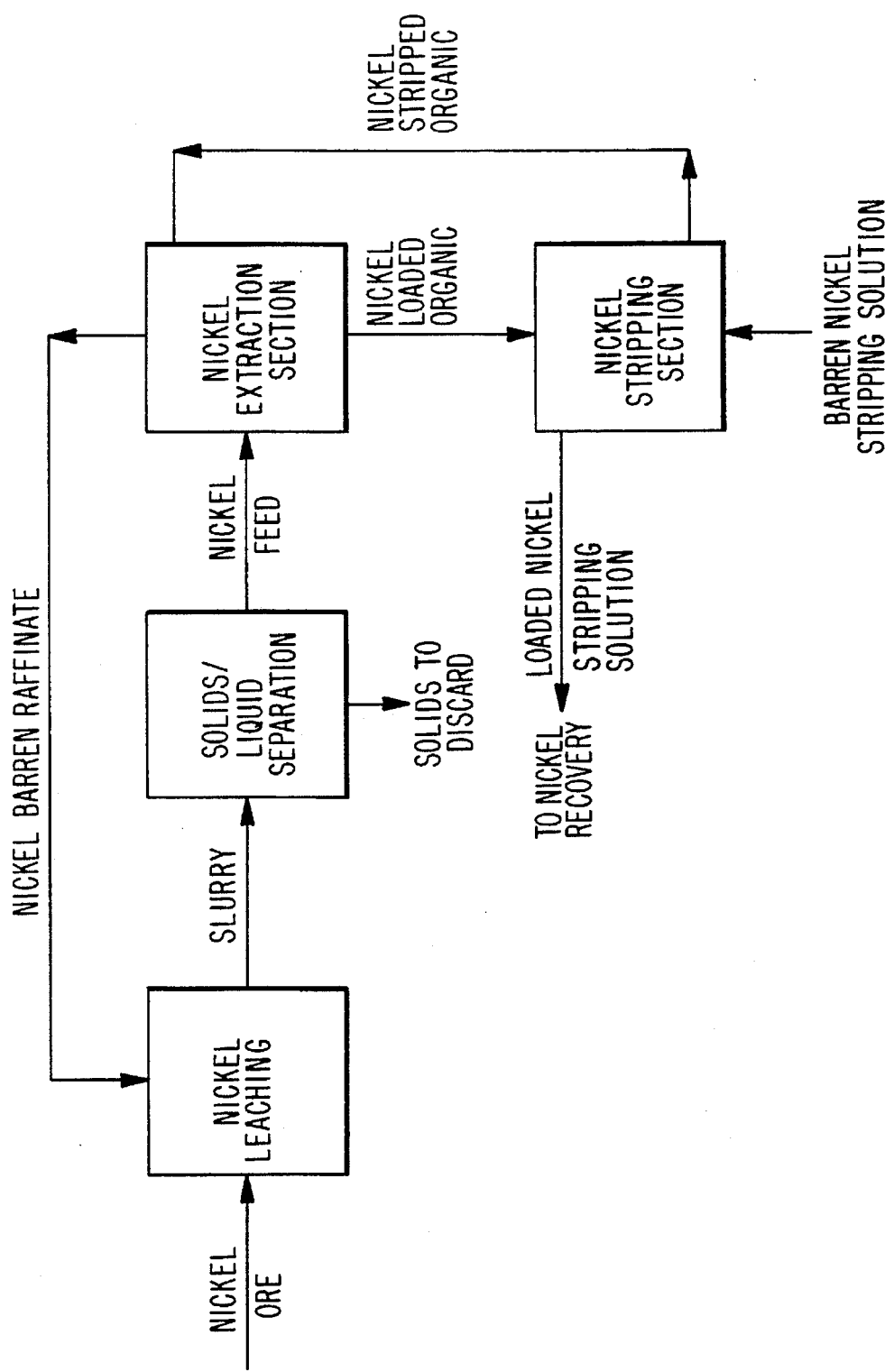
FIG. 1 of the Drawing is a diagramatic flow chart illustrating an extraction of nickel process from aqueous feed resulting from ammoniacal leaching of nickel ores.

The present invention is an improvement in the process of extracting nickel from aqueous ammoniacal solutions containing nickel values. The improvement resides in the use of an equilibrium modifier in combination with an oxime extractant dissolved in a water immiscible organic solvent which forms the organic phase into which the nickel values are extracted from the aqueous ammoniacal feed solution. After separation of the water immiscible organic phase from the aqueous solution now substantially barren of nickel values, the nickel loaded organic phase is contacted with a stripping solution comprised of a concentrated ammonia aqueous solution which strips the nickel values from the organic phase into the aqueous ammonia solution. After separation of the two immiscible phases, the aqueous solution now containing the nickel values is processed further for the recovery of the nickel by conventional nickel recovery techniques.

The use of the equilibrium modifier and the concentrated ammonia stripping solution provides improvement and advantage in the overall recovery of the nickel in that (1) there is an increase in the nickel transfer of the reagent (2) the strip solution can be built to a higher nickel concentration giving a lower volume of nickel containing solution for further processing and (3) a lesser number of stripping stages are required.

Other aspects of the invention will become apparent upon consideration of the following detailed description and the illustrative examples.

DETAILED DESCRIPTION OF THE INVENTION

The starting material for large scale solvent extraction of nickel is an aqueous leach solution obtained from leaching a body of ore which contains nickel as illustrated in FIG. 1 of the drawing. While the drawing illustrates the feed solutions as obtained from leaching of nickel containing ores, the invention is applicable to any aqueous ammoniacal solutions containing nickel values. The drawing illustrates the various steps from leaching of the ore to the strip solution being directed to the nickel recovery processing. The present invention deals primarily with the extraction and stripping steps and accordingly the source of the aqueous nickel feed solution need not be limited to an ore leach solution and the final nickel recovery processing may be any conventional recovery process whether electrowinning, precipitation and/or pyrometallurgical methods. The present invention is also applicable to batch processing, however, a continuous process including multiple extraction and stripping steps is the more common and cost effective method.

As illustrated in the drawing a nickel ore is leached to provide a slurry of ore solids and a liquid aqueous solution containing the dissolved metal values i.e. nickel values. The solids are separated by known methods, such as filtration, and the remaining aqueous solution containing the nickel values forms the feed solution for the extraction step which will comprise one or more stages of mixer-settler units. The leach solution is an aqueous ammoniacal dilute solution. The solution will also contain counter anions which may be carbonate, bicarbonate, sulfate, bisulfate, chloride, nitrate and other common anions. In the large scale commercial operation, the carbonate anion is most common and a respresentative feed solution for purposes of illustrating the invention will contain carbonate, either obtained from $CO_2$ gas or introduced as ammonium carbonate.

In leaching, the aqueous ammoniacal solution dissolves the nickel and other metals as it trickles through the ore to provide an aqueous solution of the metal values, constituting the feed solution for the extraction step shown in the drawing.

The aqueous solution is mixed in tanks with an extraction reagent which is dissolved in an organic solvent, e.g., a kerosene. The reagent includes an extractant chemical which selectively forms a metal-extractant complex with the nickel ions. The step of forming the complex is called the extraction or loading stage of the solvent extraction process.

In a continuous countercurrent process, much as would be practiced commercially, the extraction step is carried out with a series of mixer-settler units in which the outlet of a mixer continuously feeds a large settling tank where the organic solvent (organic phase), now containing the nickel-extractant complex in solution, is separated from the depleted aqueous solution (aqueous phase). This part of the process is called phase separation. Usually, the process of extraction is repeated through two or more mixer-settler stages, in order to more completely extract the desired metal. Where two or more mixer-settler stages are employed for extraction, countercurrent flow of the feedstock aqueous solution and the organic phase or reagent solution is employed.

After extraction, the depleted aqueous feedstock (nickel barren raffinate) is either discharged or recirculated as shown in the drawing to the ore body for further leaching. The nickel loaded organic phase containing the dissolved nickel-extractant complex is fed to another set of mixer tanks, where it is mixed with an aqueous concentrated ammonia strip solution, indicated in the drawing as the barren nickel stripping solution. The highly concentrated ammonia strip solution breaks apart the nickel-extractant complex and permits the purified and concentrated nickel to pass to the strip aqueous phase. As in the extraction process described above, the mixture is fed to a settler tank for separation of the two immiscible aqueous and organic phases. This process of breaking the nickel-extractant complex is called the stripping stage, and the stripping operation may be repeated through two or more countercurrent or cocurrent mixer-settler stages to more completely strip the nickel from the organic phase. From the stripping settler tank, the regenerated nickel stripped organic phase is recycled to the extraction mixers to begin extraction again, and the strip aqueous phase is customarily fed to a conventional nickel recovery stage where the nickel is recovered by conventional methods either by electrowinning, precipitation and or pyrometallurgical methods.

If metals other than nickel are present in the feed solution and would be extracted by forming a metal-extractant complex, other treatments may be necessary to remove these metals. As indicated in the related art discussed earlier, if copper is present this may be extracted selectively prior to the extraction of the nickel. If cobalt is present this may be handled by treating the nickel barren raffinate prior to returning the solution to nickel leaching. A cobalt stripping step, in which a small part of the nickel stripped organic flow is treated, can be utilized.

As indicated earlier, while the drawing illustrates the invention describing an ore leaching system, any aqueous ammoniacal solution containing nickel values, regardless of source may be employed. The feed solution preferably contains less than 100 grams per liter (g/l) $NH_3$, more desirably less than 70 g/l. Most preferably the $NH_3$ content is less than 40 g/l. The concentrated ammonia stripping solution preferably is a concentrated solution of aqueous ammonia saturated with carbon dioxide. The solution is accordingly an $NH_3$—ammonium carbonate solution. Generally the aqueous solution is defined as being one showing greater than 100 g/l $NH_3$ and 50 g/l $CO_2$. It is preferable that the solution contains greater than 180 g/l $NH_3$ and 50 g/l $CO_2$. The most preferred will contain greater than 240 g/l $NH_3$ and 50 g/l $CO_2$.

Reagents for use in practice of the process of the invention include those containing one or more hydroxy aryl oxime extractants of the hydroxy aryl aldoxime or hydroxy aryl ketone oxime type.

Hydroxy aryl ketoxime extractants which may be employed in reagents for practice of the invention are those of Formulas I and II below:

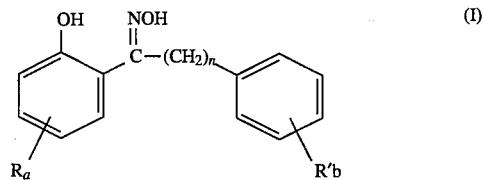

in which R and R' may be individually alike or different and are saturated aliphatic groups of 1–25 carbon atoms, ethylenically unsaturated alipathic groups of 3–25 carbon atoms or —OR" where R" is a saturated or ethylenically unsaturated aliphatic group as defined; n is 0 or 1; and a and b are each 0, 1, 2, 3, 4, with the proviso that both are not 0 and the total number of carbon atoms in $R_a$ and $R'_b$ is from 3 to 25,

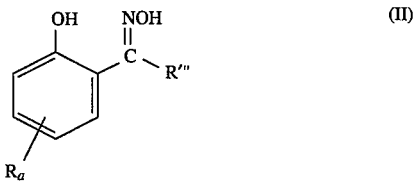

in which R and a are as defined with respect to formula I and R'" is a saturated aliphatic group of 1–25 carbon atoms or an ethylenically unsaturated aliphatic group of 3–25 carbon atoms, with the proviso that the total number of carbon atoms in $R_a$ and R'" is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is methyl and R and a are as designated as being preferred for compounds of Formula I.

Compounds of Formula I wherein n has a value of 0 (i.e., hydroxy benzophenone oxime compounds) may suitably be prepared according to the methods disclosed in Swanson U.S. Pat. Nos. 3,952,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxy group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commerical nonylphenol and dodecyl phenol are respectively employed in their synthesis.

Compounds of Formula I wherein n has a value of 1 (i.e., hydroxy phenyl benzyl ketone oxime compounds) may suitably by prepared according to the methods described in Anderson, U.S. Pat. No. 4,029,704. Preferred phenyl benzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxy phenyl alkyl ketone oxime compounds) may suitable be prepared according to the procedures disclosed in U.K. Pat. No. 1,322,532. As noted with regard to benzophenone oxime and phenyl benzyl ketone oxime compounds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Hydroxy aryl aldoxime extractants which may be employed in reagents for practice of the invention are those of Formula III

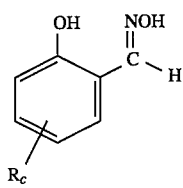

(III)

in which R is as defined above with respect to Formulas I and II, c has a value of 1, 2, 3 or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley, et al., U.S. Pat. No. 4,020,105 or Ackerley et al., U.S. Pat. No. 4,020,106 or by oximation of aldehydes prepared according to Beswick, U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Reagents may include a single extractant chemical as illustrated above or may comprise mixtures of different aldoxime or ketoxime extractants of the type illustrated in U.S. Pat. Nos. 4,507,268, 4,544,532 and 4,582,689. Reagents useful in practice of the invention may also include kinetic additives. Preferred kinetic additives include a-hydroxy oximes described in Swanson, U.S. Pat. No. 3,224,873, and α-, β-dioximes described in Koenders, et al., U.S. Pat. No. 4,173,616. Kinetic additives (frequently referred to as "accelerators", "catalysts", "kinetic catalysts" or "kinetic syngergists") are generally defined as chemical substances included in solvent extraction reagents for the purpose of increasing the rate of transfer of metal values between organic and aqueous phases without materially affecting the position of equilibrium.

Modifiers of copper extraction and stripping equilibria, generally described as equilibrium modifiers are usually incorporated in the reagent formulations of so called "strong" extractants, and are incorporated to shift equilibria in a manner facilitating stripping and to enhance overall copper extraction efficiency. A wide variety of modifier chemicals has been proposed for use in formulation of solvent extraction reagents for copper. These have included: long chain ($C_6$ to $C_{20}$) aliphatic alcohols such as isodecanol, 2-ethylhexanol, and tridecanol; long chain $C_6$–$C_{20}$ alkyl phenols such as nonylphenol (see. e.g., Hartlage, U.S. Pat. No. 3,725,046); branched chain, $C_6$ to $C_{30}$ esters, such as, 2,2,4-trimethyl- 1,3-propane diol diisobutyrate and various organophosphorous compounds such as tributylphosphate (see e.g., Ritcey, et al. Transactions of the International Solvent Extraction conference, 1974, pp. 2437–2481). Equilibrium modifiers most frequently employed include nonylphenol, tridecanol and tri-2-ethylhexylphosphate. These equilibrium modifiers are useful in the present invention in relation to nickel extraction and stripping.

As indicated earlier the oxime extractant reagent is dissolved in an essentially water-immiscible, liquid hydrocarbon solvent and the resulting organic solution is contacted with the nickel containing aqueous phase to extract at least a portion of the nickel values into the organic phase. The phases are then separated and the nickel values are stripped from the loaded organic phase by use of an aqueous stripping medium. Prior to stripping it is not unusual to wash the loaded organic phase, particularly where trace metals are loaded on the organic extractant. One or more wash stages may accordingly be included on the nickel loaded organic stream depending on the trace metals loaded, the amount of aqueous entrainment carried by the organic stream and the required purity of the final nickel loaded stripping solution.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors the design of the solvent extraction plant (i.e., mixer-settlers, Podbielniak extractors, etc.), the value of the metal being recovered, disposal of plant effluent and the like. Essentially, all of the major solvent extraction plants in operation currently for the recovery of metals use mixer-settlers, with relatively large organic inventories, and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are chemically inert and the costs thereof are currently within practical ranges—i.e., normally about one dollar (U.S.) per gallon. Representative commercially available solvents are Kermac 470B (an aliphatic kerosene available from Kerr-McGee—Flash Point 175° F.), Kermac 400-500, an aliphatic kerosene similar to Kermac 470B having a Flash Point of 180° F., Chevron Ion Exchange Solvent (available from Standard Oil of California—Flash Point 195° F.), Escaid 100 and 110 (available from Exxon-Europe—Flash Point ≅180° F.), Exxsol D 80 available from Exxon U.S.A. corresponds to Escaid 110, Norpar 12 (available from Exxon-U.S.A.—Flash Point 160° F.), Conoco C-1214 (available from Conoco—Flash Point 160° F.), Aromatic 150 (an aromatic kerosene available from Exxon U.S.A.—Flash Point 150° F.), and various other kerosenes and petroleum fractions available from other oil companies.

In the process of the present invention, the organic solvent solutions will preferably contain from about 2 to 75% by weight of the extractant reagent and even more preferably from about 5 to 20% by weight thereof. Additionally, volume ratios of the organic:aqueous phase vary widely since the contacting of any quantity of the reagent solution with the metal containing aqueous phase will result in extraction of metal values into the organic phase. However, for commercial practicality, the organic:aqueous (O/A) phase ratios are preferably in the range of about 5:1 to 1:5. For practical purposes, the extracting and stripping are normally conducted at ambient temperatures and pressures although higher or lower temperatures and/or pressures are entirely operable.

To further illustrate the various objects and advantages of the present invention, the following examples are provided. It is understood that their purpose is entirely illustrative and in no way intended to limit the scope of the invention. In the illustrative examples the oxime extractants (all available from Henkel Corporation) employed are as follows:

LIX®84—which is about a 1.54 molar mixture of the active extractant 5-nonyl-2-hydroxyacetophenone oxime in the diluent Escaid 100.

LIX®860—which is about a 1.78 molar mixture of the active extractant 5-dodecylsalicylaldoxime in the diluent Escaid 100.

LIX®65N—which is about a 1.13 molar mixture of the syn and anti isomers of the active extractant 5-nonyl-2-hydroxybenzophenone oxime in the diluent Escaid 100.

EXAMPLE 1

The following organic solutions were prepared using LIX 84 extractant reagent:

| Solution | LIX 84 Content | Tridecyl alcohol Content | Diluent Kemac 400–500 |
| --- | --- | --- | --- |
| A | 30 v/v % | None | 70 v/v % |
| B | 30 v/v % | 10 v/v % | 60 v/v % |
| C | 30 v/v % | 17 v/v % | 53 v/v % |
| D | 30 v/v % | 30 v/v % | 40 v/v % |

The above solutions were then maximum loaded by three contacts, 3 minutes each contact of the organic with a fresh synthetic nickel solution containing ~11.2 g/l Ni, 48 g/l $NH_3$ and 20 g/l $CO_2$. The following nickel maximum loadings were obtained A=13.9 g/l Ni, B=13.5 g/l Ni, C=13.3 g/l Ni, D=13.3 g/l Ni respectively. Then the respective maximum loaded samples were diluted with their original barren organic solutions to give loaded organic solutions that would more closely mimic the loaded organic solution expected in a continuous circuit run.

After thorough mixing the resultant nickel loaded organic solutions were stripped at various organic to aqueous ratios such that strip isotherms were generated for each organic. The strip aqueous solution contained 463 g/l $(NH_4)_2CO_3$ and 83 g/l $NH_3$. The data are shown in Table I.

TABLE 1

| | Strip Isotherm Data. Analysis in g/l Ni | | | | | | | |
| --- | --- | --- | --- | --- | --- | --- | --- | --- |
| Strip | Organic A | | Organic B | | Organic C | | Organic D | |
| O/A | Org | Aq | Org | Aq | Org | Aq | Org | Aq |
| 20/1 | 11.0 | 24.4 | 10.3 | 33.9 | 10.3 | 41.0 | 9.8 | 44.0 |
| 10/1 | 10.2 | 20.2 | 9.8 | 28.4 | 9.0 | 31.7 | 8.4 | 34.3 |
| 7.5/1 | 9.8 | 18.5 | 8.9 | 25.5 | 8.5 | 27.1 | 7.7 | 30.8 |
| 5/1 | 9.0 | 16.3 | 8.0 | 21.4 | 7.8 | 21.9 | 6.7 | 25.3 |
| 2/1 | 7.3 | 9.6 | 5.9 | 12.1 | 5.3 | 12.8 | 4.4 | 13.6 |
| 1/1 | 6.0 | 6.2 | 4.5 | 7.3 | 3.7 | 7.6 | 3.3 | 7.8 |
| Loaded Org | 12.0 | | 11.9 | | 12.0 | | 12.0 | |

This example illustrates that the addition of tridecyl alcohol (TDA) results in a reagent:

1. From which a strip solution containing increased amounts of nickel can be generated. Note for example that as the level of TDA increases from 0 to 10 to 17 and to 30 v/v % the nickel contained in the aqueous phase at the 20/1 contact increases from 24.4 to 33.9 to 41.0 to 44.0 g/l Ni respectively. A more concentrated nickel solution is more easily and more economically treated for final nickel recovery.
2. Which has a greater nickel transfer ability. For example, the reagent containing no added TDA shows a nickel transfer of 6 g/l (12.0 g/l Ni on the loaded organic minus 6.0 g/l Ni on the organic from the O/A=1/1 strip) while that containing 30 v/v % TDA shows a nickel transfer of 8.7 g/l (12.0–3.3), an increase in nickel transfer of 45 percent.

EXAMPLE 2

The following organic solutions were prepared using LIX® 65N extractant reagent:

| Solution | LIX 65N Content | Tridecyl alcohol Content | Diluent Kermac 400–500 |
|---|---|---|---|
| A | 30 v/v % | None | 70 v/v % |
| B | 30 v/v % | 10 v/v % | 60 v/v % |
| C | 30 v/v % | 17 v/v % | 53 v/v % |
| D | 30 v/v % | 30 v/v % | 40 v/v % |

The above organic solutions were loaded with nickel as described in Example 1 and then diluted slightly with barren organic to more closely resemble the loaded organic solutions expected in a continuous circuit run. After thorough mixing the respective nickel loaded organic solutions were stripped by contacting them at the indicated O/A ratios for one hour in a closed vessel at 23° C. with an aqueous solution containing 463 g/l $(NH_4)_2 CO_3$ and 83 g/l $NH_3$. After the phases separated they were analyzed to give the data in Table 2.

TABLE 2

| | Strip Data. Analysis in g/l Ni | | | | | | | |
|---|---|---|---|---|---|---|---|---|
| Strip | Organic A | | Organic B | | Organic C | | Organic D | |
| O/A | Org | Aq | Org | Aq | Org | Aq | Org | Aq |
| 20/1 | 5.8 | 27.8 | 5.4 | 37.0 | 4.8 | 40.7 | 4.7 | 46.5 |
| 10/1 | 5.1 | 20.4 | 4.2 | 24.8 | 3.9 | 27.9 | 3.8 | 32.2 |
| 7.5/1 | 4.6 | 17.1 | 3.9 | 20.4 | 3.5 | 23.0 | 3.5 | 25.8 |
| 5/1 | 4.2 | 13.1 | 3.5 | 16.0 | 3.1 | 17.5 | 2.9 | 19.9 |
| 2/1 | 3.4 | 7.1 | 2.5 | 8.2 | 2.0 | 9.2 | 1.7 | 10.2 |
| 1/1 | 2.8 | 4.2 | 2.0 | 4.9 | 1.4 | 5.1 | 1.2 | 5.7 |
| Loaded Org | 7.3 | | 7.0 | | 6.9 | | 6.9 | |

This example is similar to Example 1 showing that increased amounts of modifier result in a) the ability to build a pregnant strip solution containing a significantly higher nickel content, and b) a greater increase in nickel transfer.

EXAMPLE 3

The following organic solutions were prepared using LIX 860 extractant reagent:

| Solution | Reagent Content | Tridecyl alcohol Content | Diluent Kermac 400–500 |
|---|---|---|---|
| A | 30 v/v % | None | 70 v/v % |
| B | 30 v/v % | 10 v/v % | 60 v/v % |
| C | 30 v/v % | 20 v/v % | 50 v/v % |
| D | 30 v/v % | 30 v/v % | 40 v/v % |

The above solutions were loaded with nickel by contacting them 3 times with a laboratory prepared nickel solution containing ~11.2 g/l Ni, 48 g/l $NH_3$ and 20 g/l $CO_2$. The respective nickel loaded solutions were then stripped by contacting them at the indicated O/A ratios for one hour in a closed vessel at room temperature with an aqueous solution containing 473 g/l $(NH_4)_2CO_3$ and 105 g/l $NH_3$. The results are shown in Table 3.

TABLE 3

| | Strip Data. Analysis in g/l Ni | | | | | | | |
|---|---|---|---|---|---|---|---|---|
| Strip | Organic A | | Organic B | | Organic C | | Organic D | |
| O/A | Org | Aq | Org | Aq | Org | Aq | Org | Aq |
| 20/1 | 14.5 | 20.4 | 15.0 | 27.9 | 14.4 | 33.2 | 14.2 | 35.5 |
| 1/1 | 9.8 | 5.4 | 10.4 | 6.2 | 9.6 | 6.4 | 9.1 | 6.7 |
| Loaded Org | 15.4 | | 16.5 | | 16.1 | | 16.0 | |

Example 3 shows that the addition of the modifier tridecyl alcohol to the aldoxime class of reagents also benefits nickel stripping. Note that as the tridecyl alcohol (TDA) content increases from 0 to 10, to 20 to 30 v/v %, the nickel contained in the aqueous phase at an O/A of 20/1 increases from 20.4 to 27.9 to 33.2 to 35.5 g/l nickel respectively. Note also that the nickel transfer of the organic increases with an increase in TDA content. For example, the loaded organic minus the stripped organic from the O/A=1/1 contact increases from 5.6 g/l Ni for organic A to 6.9 g/l Ni for organic D.

EXAMPLE 4

The following organic solutions were prepared using LIX 84 extractant reagent:

| Solution | Reagent Content | Tridecyl alcohol Content | Kerosene Kermac 400–500 |
|---|---|---|---|
| A | 30 v/v % | None | 70 v/v % |
| B | 30 v/v % | 110.5 g/l | Remainder |

The solutions were loaded with nickel in the way described in Example 3. Stripping was conducted in a square glass vessel by stirring the organics at the described O/A ratios with an aqueous solution containing 210 g/l $NH_3$ and 1.2 molar $(NH_4)_2CO_3$ at the temperatures indicated for 10 minutes. The strip data is shown below:

TABLE 4

| | Strip Data, Analysis in g/l Ni | | | | | |
|---|---|---|---|---|---|---|
| Strip | Organic A | | | Organic B | | |
| O/A | Org | Aq | Temp | Org | Aq | Temp |
| 20/1 | 12.8 | 20.3 | ~62° C. | 12.0 | 31.6 | ~55° C. |
| 1/1 | 5.9 | 9.2 | ~55° C. | 3.8 | 10.0 | ~52° C. |
| Loaded Org | 13.6 | | | 13.0 | | |

This example compliments Example 1 in showing that the addition of modifier results is a reagent which allows for the generation of a loaded strip solution containing increased amounts of nickel and a greater nickel net transfer for the organic phase. In addition this example shows that the unexpected benefits of modifier addition are also obtained at increased temperature.

EXAMPLE 5

The following organic solutions were preparated using LIX 84 extractant reagent and then loaded with nickel as described in Example 3. In each case the diluent Kermac 400-500 is the balance of the respective solution.

| Solution | LIX 84 Content | Modifier Content |
|---|---|---|
| A | 30 v/v % | None |
| B | 30 v/v % | 110.5 g/l Isodecyl alcohol |
| C | 30 v/v % | 89.3 g/l Tri-2-ethylhexylphosphate |
| D | 30 v/v % | 178.8 g/l Tri-2-ethylhexylphosphate |
| E | 30 v/v % | 153.9 g/l Nonylphenol |

The nickel loaded organics were then shaken at 23° C. with an aqueous solution containing 105 g/l $NH_3$ and 473 g/l $(NH_4)_2CO_3$ for 1 hour in a closed vessel at the organic/aqueous ratios shown. After the phases separated the organic and aqueous were analysed. The data is shown in Table 5 below.

TABLE 5

| Strip | Organic A | | Organic B | | Organic C | | Organic D | | Organic E | |
|---|---|---|---|---|---|---|---|---|---|---|
| O/A | Org | Aq | Org | Aq | Org | Aq | Org | Aq | Org | Aq |
| 20/1 | 12.8 | 21.3 | 11.8 | 38.3 | 9.7 | 38.6 | 7.5 | 48.5 | 11.8 | 29.6 |
| 1/1 | 6.8 | 7.2 | | | 3.7 | 8.3 | 1.37 | 9.4 | 7.7 | 6.1 |
| Loaded Org | 13.9 | | 13.5 | | 11.6 | | 9.9 | | 13.6 | |

Example 5 shows that different modifiers can be used, some being more effective in allowing a higher content nickel strip to be built. For example, the least effective modifier on a weight basis is nonylphenol. Yet even in this case the nickel content of the aqueous phase at the O/A=20/1 shakeout is 29.6 g/l compared to the value 21.3 g/l Ni obtained in the absence of the modifier. This represents an increase in Ni content of about 39%. The most efficient modifier on a weight basis in this example appears to be tri-2-ethylhexylphosphate where the aqueous nickel content of the 20/1 point represents an increase in nickel concentration of about 81% over the value where no modifier is present.

EXAMPLE 6

The following organic solutions were prepared and loaded as described in Example 3.

| Solution | Reagent Concentration | Tridecyl alcohol Content | Diluent Kermac 400–500 |
|---|---|---|---|
| A | 22.5 v/v % LIX 84, 7.5 v/v % LIX 860 | 0 | 70 v/v % |
| B | 22.5 v/v % LIX 84, 7.5 v/v % LIX 860 | 10 v/v % | 60 v/v % |

These nickel loaded organic solutions were then stripped as described in Example 3. The results are shown below.

TABLE 6

| Strip | Organic A | | Organic B | |
|---|---|---|---|---|
| O/A | Org | Aq | Org | Aq |
| 20/1 | 12.9 | 22.2 | 11.9 | 32.9 |
| 1/1 | 7.6 | 7.3 | 6.3 | 7.6 |
| Loaded Organic | 14.1 | | 13.6 | |

This example shows that mixtures of the oximes behave much like the individual components when modified with tridecyl alcohol.

In the following examples continuous circuits were operated under the conditions with the results noted.

EXAMPLE 7

Staging: 3 Extraction, 3 Strip with 2.75 minute mixer retention time
Temperature: 40°–45° C. in extraction
Advance Organic/Aqueous Flows: about 1/1 in extraction and about 8.3/1 in strip
Organic: 30 v/v % LIX 84, 16.75 v/v % tridecyl alcohol in the diluent Shellsol 2046 (an aliphatic kerosene similar to Kermac 400-500 having a Flash point of about 180° F.).
Nickel Feed Solution: 8.35 g/l Ni, 0.42 g/l Co, 16 ppm Cu, 4 ppm Fe, 1 ppm Mn, 50 ppm Zn, ~30 ppm Mg, 26 g/l $NH_3$, 18 g/l $CO_2$
Barren Nickel Stripping Solution: 250 g/l $NH_3$, 212 g/l $CO_2$ Circuit Results After 45.25 Hours of Operation Nickel Loaded Organic: 12.0 g/l Ni
Nickel Stripped Organic: 3.30 g/l Ni
Nickel Barren Raffinate: 24 ppm Ni, 44 ppm Zn, 450 ppm Co
Loaded Nickel Strip Solution: 77 g/l Ni, 3 ppm Co, 126 ppm Cu, 11 ppm Fe, 4 ppm Mn, 37 ppm Zn These circuit results show 99.8% nickel recovery coupled with a loaded nickel strip solution of 77.0 g/l Ni. There is excellent selectivity of nickel over cobalt and zinc.

EXAMPLE 8

All conditions were the same as Example 7 except for the staging which was 2 extraction, 4 strip.

Circuit Results After 10.5 Hours of Operation

Nickel Loaded Organic: 10.2 g/l Ni
Nickel Stripped Organic: 2.15 g/l Ni

Nickel Barren Raffinate: 65 ppm Cu, 417 ppm Co
Loaded Nickel Strip Solution: 72.2 g/ Ni, 116 ppm Cu
The circuit results show 99.5% nickel recovery coupled with a nickel loaded strip solution of 72.2 g/l Ni.

EXAMPLE 9

All conditions were the same as Example 7 except for the staging, which was 2 extraction, 3 stripping, and the organic which consisted of about 35 v/v % LIX 84 and 19.5 v/v % tridecylalcohol in Shellsol 2046.

Results After 7 hours of Continuous Operation

Nickel Barren Raffinate: 147 ppm Ni, 29 ppm Mg
Loaded Nickel Strip Solution: 75 g/l Ni, 6 ppm Mg
These circuit results represent 98.8% Ni recovery, and excellent selectivity of nickel over magnesium coupled with a loaded nickel strip solution of 75 g/l Ni.

Modifications and variations in the practice of the invention as illustrated above are expected to occur to those skilled in the art and consequently only those limitations as appear in the appended claims should be placed thereon.

We claim:

1. A process for recovering nickel from aqueous ammoniacal solutions containing nickel values, with improved selectivity over any Co and Zn values also contained in said ammoniacal solution, which solution contains $NH_3$ in an amount less than about 40 g/l $NH_3$ comprising:

(a) contacting said aqueous ammoniacal solution containing the nickel values with an organic solution comprising a water immiscible organic solvent containing dissolved from about 2% about 75% by weight of a water insoluble extractant consisting of a 5-alkyl-2-hydroxyacetophenone oxime in which the alkyl group contains from about 7 to about 12 carbon atoms and an equilibrium modifier in an amount of up to about 35 volume percent in the organic solution selected from the group consisting of a $C_6$ to $C_{20}$ aliphatic alcohol, a $C_6$ to $C_{20}$ alkyl phenol, 2,2,4-trimethyl-1,3-pentane diol diisobutyrate and tri-2-ethylhexyl phosphate, said organic solvent, the oxime and the equilibrium modifier forming a water immiscible organic phase, whereby nickel values are extracted from said aqueous ammoniacal solution into said organic phase, thereby providing a nickel pregnant organic phase and a nickel barren aqueous phase;

(b) separating said aqueous phase from said organic phase;

(c) contacting said nickel pregnant organic phase containing the equilibrium modifier with a concentrated stripping solution containing greater than about 100 g/l $NH_3$ and saturated with carbon dioxide, whereby said nickel values are stripped from the organic phase into said aqueous ammonia stripping solution;

(d) separating said aqueous stripping solution from the water immiscible organic phase; and (e) recovering said nickel values from said aqueous strip solution.

2. A process as defined in claim 1 wherein said carbon dioxide is present in said aqueous ammonia stripping solution in an amount of about 50 g/l $CO_2$.

3. A process as defined in claim 1, wherein said water immiscible solvent is kerosene having a flash point greater than about 150 degrees Fahrenheit.

4. A process as defined in claim 3 wherein the oxime extractant is 5-nonyl-2-hydroxy acetophenone oxime, said equilibrium modifier is tridecanol in an amount of about 10 to about 30 v/v % and said aqueous ammonia stripping solution contains about 463 g/l $(NH_4)_2CO_3$ and about 83 g/l $NH_3$.

5. A process as defined in claim 3 in which said aqueous ammonia stripping solution contains greater than 180 g/l $NH_3$ and about 50 g/l $CO_2$.

6. A process as defined in claim 3 in which said aqueous ammonia stripping solution contains greater than about 240 g/l $NH_3$ and about 50 g/l $CO_2$. n 7. A process as defined in claim 3 in which said oxime extractant is 5-nonyl-2-hydroxy acetophenone oxime and said equilibrium modifier is tridecanol present in an amount of about 110.5 g/l and said aqueous ammonia strip solution containing about 210 g/l $NH_3$ and 1.2 moles $(NH_4)_2CO_3$.

8. A process as defined in claim 3, in which said oxime extractant is 5-nonyl-2-hydroxy acetophenone in an amount of about 30 v/v % of the organic solution, the modifier is selected from the group consisting of (i) isodecyl alcohol present in an amount of about 110.5 g/l and (ii) tri-2-ethylhexyl phosphate present in an amount of about 89 g/l or about 179 g/l and (c) nonyl phenol present in an amount of about 154 g/l with the kerosene being the remainder of the organic solution, and said aqueous ammonia stripping solution contains about 105 g/l $NH_3$ and about 473 g/l $(NH_4)_2CO_3$.

9. A process as defined in claim 3 in which the organic solution comprises about 30 v/v % 5-nonyl-2-hydroxy acetophenone oxime, about 16.75 to about 19.5 v/v % tridecanol with the kerosene forming the balance of the organic solution.

10. A process as defined in claim 9 in which about 99% nickel is recovered.

* * * * *